Aug. 6, 1968  W. H. HOYERMAN  3,395,937
TRUCK ASSEMBLY
Filed Oct. 24, 1966
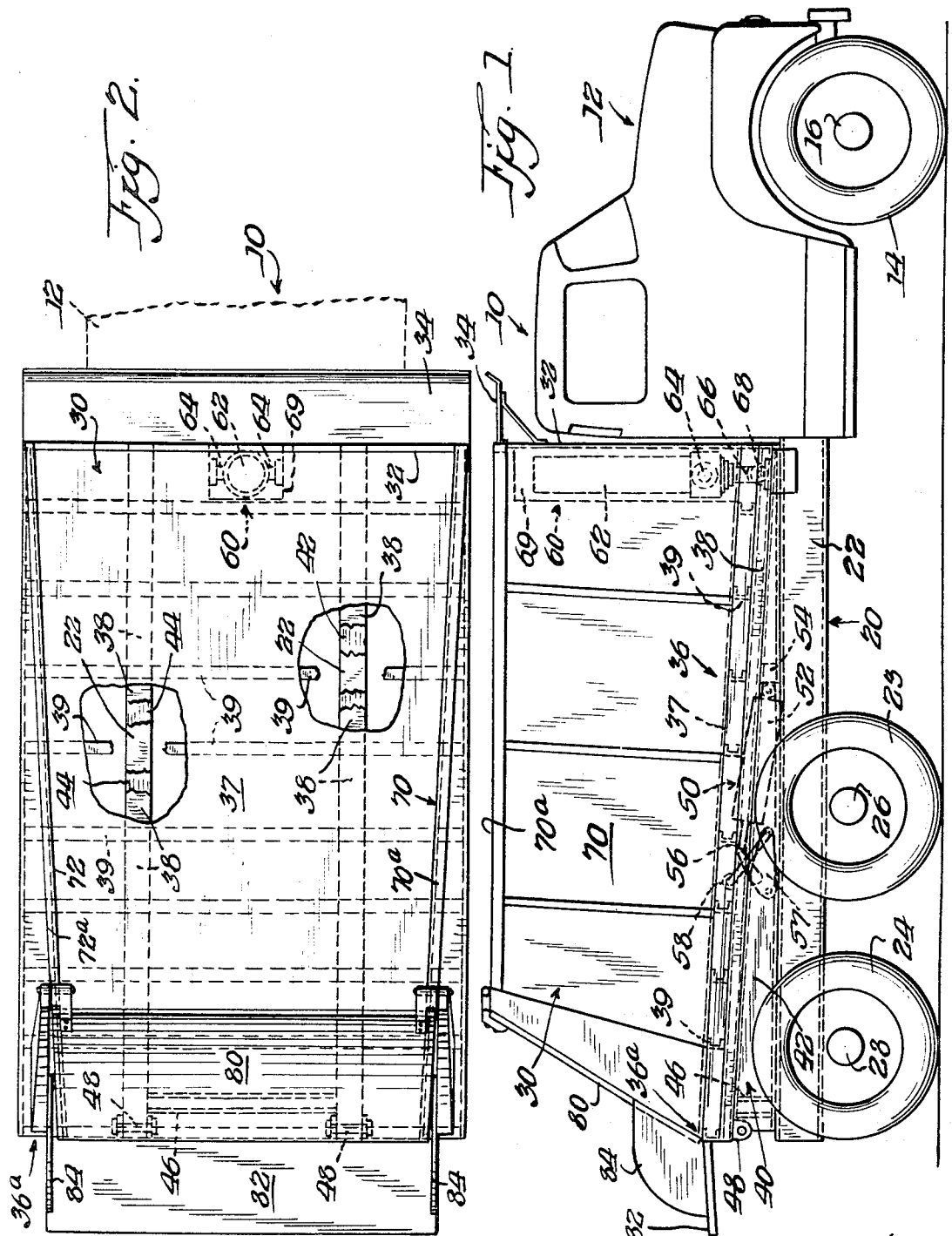
Inventor
William H. Hoyerman.
By Hume, Groen, Clement & Hume,
Attys.

3,395,937
TRUCK ASSEMBLY
William H. Hoyerman, Deerfield, Ill., assignor to General Body Sales Corporation, Chicago, Ill., a corporation of Illinois
Filed Oct. 24, 1966, Ser. No. 588,888
6 Claims. (Cl. 296—28)

This invention generally relates to a construction for vehicles, and more particularly relates to a novel construction for a truck assembly.

Truck manufacturers have been constantly striving to develop a truck assembly which would permit a maximum amount of material to be transported in the truck body, while maintaining the gross weight of the loaded truck within predetermined maximum limits. The need for such an improved truck assembly has become more pressing in recent years due to the strict regulations on truck size and gross weight imposed by various governmental bodies. It is common, for instance, for regulations to limit the maximum gross weight on the tandem rear axles of a truck to 32,000 pounds, or 16,000 pounds per truck axle. It is apparent that a truck assembly which could carry a subtantially increased gross load without exceeding a predetermined maximum weight per axle would have great utility to the trucking and transportation industries.

Accordingly, it is the principal object of the present invention to provide a new and improved truck assembly having a substantially increased load-carrying capacity.

Another object of this invention is to provide an improved truck assembly which substantially increases the gross loading capacity of the truck while permitting the load on each truck axle to be maintained within predetermined limits.

Still another object of this invention is to provide a truck assembly having a substantial load-carrying capacity which maintains the loading on the truck axles within predetermined limits by distributing the gross loading of the truck more uniformly onto each of the axles of the truck assembly.

A further object of this invention is to provide a new and improved truck assembly which permanently shifts the center of gravity of the gross load on the truck forwardly away from the rear truck axles and toward the front truck axles of the truck, thereby distributing the gross load more accurately and uniformly to all of the axles of the truck assembly.

Briefly, the present invention contemplates the provision of a new and improved truck assembly which includes a truck chassis and truck body combination. The truck body in accordance with this invention has a forwardly tapering rear wall member and tapering side wall members which converge adjacent the rear wall member and diverge toward the front of the truck body. The truck assembly according to this invention also includes means to taper the floor of the truck body forwardly so that the floor is lowered at the front of the truck body. The center of gravity of a load carried in the truck body is thereby accurately and automatically shifted forwardly on the truck assembly, and the weight upon the rear axles of the truck assembly is reduced. By such a construction, the gross load is distributed more accurately and uniformly onto both the front and rear axles of the truck. The invention thus permits the maximum weight per truck axle to be controlled while at the same time permitting the gross carrying capacity of the truck assembly to be increased. The invention has been found to be particularly effective in controlling the weight distribution of loads which seek their own "water level" in the truck body, such as loads of hot asphalt, fine aggregate, and the like.

Other objects and features of the present invention will become more apparent from the following description of an embodiment thereof, taken in conjunction with the following drawings in which:

FIGURE 1 is an elevational view of a truck assembly embodying the features of the present invention; and FIGURE 2 is a partial plan view of the truck assembly illustrated in FIGURE 1.

Referring generally to the drawing, the truck assembly of this invention is generally indicated by the reference numeral 10. The truck 10 includes a forward cab portion 12 which is supported by front wheels 14 and front axles 16 in the usual manner. The rearward portion of the truck 10 comprises a chassis 20 which is supported by tandem rear wheels 23 and 24 mounted on tandem rear axles 26 and 28, respectively. The truck assembly 10 is also provided with a load-carrying truck body 30 connected to the chassis 20 by an underframe structure 40. The illustrated truck assembly 10 is of the dump truck type, and therefore also includes a hoist assembly 50 connected between the truck body 30 and the chassis 20. The hoist assembly 50 is selectively operative to raise and lower the truck body 30 with respect to the chassis 20. In accordance with this invention, the truck body 30, the underframe structure 40, and the chassis 20 of the truck assembly 10 function in combination to shift the center of gravity of any load being transported in the body 30 forwardly toward the front axle 16 and away from the tandem rear axles 26 and 28, to thereby more evenly distribute the gross weight of the load onto all of the axles of the truck assembly.

Referring more specifically to the drawing, the cab portion 12 of the truck 10 is of conventional construction, and houses the truck power unit or motor (not shown). In the illustrated truck construction, the truck 10 is a rear-wheel drive type truck, and includes a drive train (not shown) which transfers the power of the motor of the truck 10 to the tandem rear wheels 23 and 24. The chassis 20 forming the rear portion of the truck 10 includes a pair of structurally reinforced long members 22. The members 22 are generally parallel and are welded or otherwise rigidly joined to the cab portion 12. Similarly, the long members 22 and the rear axles 26 and 28 are joined by any suitable spring assembly (not shown), as is well-known to those skilled in the art.

As seen in FIGURE 1, the hoist assembly 50 is an underbody hoist which is connected in any suitable manner between the truck chassis 20 and the truck body 30. As is well-known in the art, the hoist assembly 50 includes a hydraulically actuated piston 52 pivotally attached at one end, such as by a cross-member 54, to the underframe structure 40 on the truck chassis 20. A hydraulic ram 56 is telescoped with the hydraulic cylinder 52 and is connected to a pivotal rocker arm 57. The rocker arm 57 is pivoted to the chassis 20 in a suitable manner, and includes lift arms 58 which are pivotally joined to the underside of the truck body 30. In operation, the hoist assembly 50 is remotely actuated by hydraulic controls (not shown) so that the ram 56 is forced to telescope with respect to the cylinder 52. The telescoping movement of the ram 56 rotates the rocker arm 57 counter-clockwise, as viewed in FIGURE 1, and forces the lift arms 58 upwardly against the truck body 30, thereby lifting the truck body 30 into a dumping position. Of course, the hydraulic hoist assembly 50 also can be remotely operated to retract the ram element 56 into the cylinder 52 for lowering the truck body 30 into its normal position, as shown in FIGURE 1. An illustration of the underbody hoist assembly 50 has been omitted from FIGURE 2 for clarity.

It will be appreciated by those skilled in the art that hoist assemblies other than the underbody hoist 50 can be associated with the truck assembly 10 of this invention.

For instance, the truck assembly 10 can be readily provided with a suitable front end telescopic hoist 60, as shown in phantom in FIGURES 1 and 2. The front end hoist 60 comprises an inverted seamless hydraulic cylinder 62 which is pivotally secured to the front of the truck body 30 by pivot pins 64. Ram elements 66 of the front end hoist 60 are in turn pivoted to the chassis 20 by suitable pins 68. Finally, the whole telescopic hoist assembly 60 is mounted within a small housing 69 provided in the front portion of the truck body 30. As with the underbody hoist 50, a remote-controlled hydraulic operating system (not shown) is connected to the hoist assembly 60, and can be actuated in the usual manner to selectively raise or lower the truck body 30.

The truck body 30 embodying the features of this invention is designed to shift the center of gravity of any load on the truck assembly forwardly away from the rear axles 26 and 28 and toward the front axle 16. Accordingly, the truck body 30 includes a front wall 32 which is vertically oriented when the truck 10 is in its normal transportion position, as shown in FIGURE 1. The front wall 32 also may be provided with a horizontal shield 34 to protect the cab 12 from the load being hauled. The truck body 30 further includes a reinforced floor 36 which is generally rectangular in shape. The floor 36 is formed from a flat, continuous bed member 37 of high strength material, such as alloy steel, so that the body 30 is capable of supporting heavy loads. To increase the strength of the floor bed member 37, the underside of the bed member is reinforced by an interlaced understructure formed from a pair of long beams 38 and a plurality of cross beams 39. As seen in FIGURE 1, both the long beams 38 and cross beams 39 are preferably made from high-strength channel members, and are integrally joined to each other and to the underside of the floor bed 37 by welds (not shown). In addition, as illustrated in the portion of FIGURE 2 wherein a section of the floor bed 37 is broken away, the long beams 38 are laterally spaced under the floor bed members 37 so that they will be directly supported by the truck underframe 40 and the truck chassis 20 when the truck body 30 is in its normal load-hauling position.

The truck body 30 of this invention further includes a pair of reinforced side wall members 70 and 72 which are formed from flat structural members such as high strength steel plate. These wall members 70 and 72 extend vertically upward from the body floor 36 and are welded or otherwise rigidly secured to the side portions of the body floor bed 37. As seen in FIGURE 1, the vertical height of the side wall members 70 and 72 in accordance with this invention is a selected maximum dimension at the front end of the body 30, adjacent the cab 12, and is gradiently decreased or tapered to a selected minimum dimension adjacent the rear end of the truck body 30.

As a result of such vertical tapering of the side wall members 70 and 72, the depth of the truck body 30 is substantially greater at the front end of the truck body 10, forwardly of the tandem rear axles 26 and 28. As shown in FIGURE 1, the above-described vertical heights of the side wall members 70 and 72 are preferably selected so that the top edges 70a and 72a of the wall members are positioned in a common horizontal plane when the truck assembly 10 is in its normal load-transporting condition.

As seen in FIGURE 2, the side wall members 70 and 72 are not positioned directly along the sides of the truck body floor 36, as in conventional truck assemblies. Instead, the side wall members 70 and 72 of this invention are spaced apart substantially the full width of the body floor 36 at the front end of the truck body 30, but taper horizontally inward toward the rear end of the truck body. The wall members 70 and 72 thereby converge toward the rear end of the truck assembly 10, and restrict the width of the truck body 10 above the tandem rear axles 26 and 28.

It is apparent that the above-described arrangement of the side wall members 70 and 72 results in the truck body 30 having maximum height and width at its forward end, in front of the rear axles 26 and 28, and successively decreased height and width at the rear end adjacent the rear axles 26 and 28. The load-carrying capacity of the truck body 30 is thus maximum at the front of the truck body and gradiently decreases toward the rear of the body. The center of gravity of any load in the truck body 30 is thereby moved forwardly of the rear axles 26 and 28 so that a substantial portion of the gross load is distributed to the front axle 16 of the truck assembly.

As best seen in FIGURE 1, the truck body 30 is also provided with a rear tailgate 80 which is secured, such as by tailgate hooks to the body floor 36 and to both of the side wall members 70 and 72. The lowermost end of the tailgate 80 is positioned at the extreme rearward edge 36a of the body floor 36 so that any loads in the truck body 30 can be dumped through the tailgate 80 onto the roadway behind the rear wheel 24. An extension 82 with guide walls 84 can be provided on the tailgate 80, if desired, to facilitate the rearward dumping operation.

In addition, the tailgate 80 is tapered forwardly at an acute angle from vertical, as shown in FIGURE 1. The uppermost edge of the tailgate thereby joins with the wall members 70 and 72 at a position substantially forward from the rear edge 36a of the body floor 36. Such forwardly tapered tailgate 80 also aids in more uniformly distributing the weight of a load in the truck body 30 onto all of the axles of the truck assembly 10 by shifting the center of gravity of the portion of the load carried adjacent the tailgate forwardly toward the front end of the truck body.

The underframe structure 40 in accordance with this invention, positioned between the truck body 30 and the truck chassis 20, generally comprises a pair of substantially identical frame members 42 and 44. As seen in FIGURE 2, the frame members 42 and 44 are arranged parallel to each other and are spaced apart by substantially the same distance as the spacing between the chassis long members 22. A cross-member 46 is connected between the rear frame members 42 and 44 and operates along with the forward cross-member 54 to maintain the spacing between the frame members. The cross-members 46 and 54 additionally strengthen the underframe structure 40 by reinforcing the frame members 42 and 44 in the lateral or horizontal direction.

Suitable fastening means such as welds, U-bolts or the like (not shown) is employed to secure the frame members 42 and 44 to the chassis long members 22. The frame members 42 and 44 of the underframe structure 40 are thereby supported by the chassis 20 in position to engage with the long beams 38 on the truck body 30 when the truck body is in its normal lowered position, as shown in FIGURE 1. As further shown in FIGURE 1, the rear end of the long members 38 adjacent the rear edge 36a of the truck body are connected to the frame members 42 and 44 by hinges 48 so that the truck body 30 can be raised into a dumping position above the underframe structure 40.

In accordance with this invention the above-described frame members 42 and 44 are triangular or wedge-shaped in configuration. In addition, the wedge-shaped frame members 42 and 44 are arranged on the chassis 20 so that the vertical height of the members 42 and 44 is maximum at the rear end of the truck chassis 20, adjacent the rear edge 36a of the truck body. The height of the members 42 and 44 then gradiently varies from such maximum to a minimum height at the forward end of the members, adjacent the truck cab 12.

By such an arrangement, the underframe structure 40 tapers uniformly toward the forward portion of the truck assembly 10. The tapered underframe structure 40 thereby supports the truck body floor 36 in a forwardly tapering position, with the lowermost portion of the floor 36 positioned in front of the rear axles 26 and 28. As seen in FIGURE 1, the angle between the floor 36 and the front wall member 32 is preferably at an acute angle so that the front wall member 32 is substantially vertical when the body floor 36 is supported on the underframe structure 40 in the above-described manner.

From the above description of the truck assembly 10 it is apparent that the tapered tailgate member 80, the tapered side wall members 70 and 72, and the tapering of the truck body floor 36 due to the construction of the underframe structure 40 operate in combination to concentrate any load in the truck body 30 in the forward portion of the body, in front of the tandem rear axles 26 and 28. The truck assembly 10 embodying the features of this invention thus shifts the center of gravity of a hauled load forwardly away from the rear axles 26 and 28 and toward the front axle 16. Accordingly, a greater portion of the gross weight of any load is carried by the front axle 16, and the weight of the load is more uniformly distributed onto all of the axles of the truck.

As stated hereinabove, the truck assembly 10 embodying the features of this invention thereby permits the gross load on the truck assembly to be increased substantially without exceeding any predetermined load per axle requirements or regulations. Such a truck assembly has been found particularly effective in maximizing the carrying capacity of a truck when the load to be hauled comprises the type of material, such as hot asphalt and the like, which tends to seek its own "water level" in the truck body during transport.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention as claimed.

What is claimed is:

1. A truck assembly for transporting a load of material comprising, in combination: an elongate truck chassis having longitudinally spaced front and rear axles for receiving ground-engaging wheels; a load-carrying truck body joined to the rearward portion of said chassis above said rear axle, said body including a reinforced floor structure of substantial longitudinal extent having longitudinal outer side edges and further having forward and back transverse edges positioned forwardly and rearwardly respectively of said rear axle; a first wall member rigidly secured to said floor structure adjacent said forward edge and extending transversely across said floor structure to thereby define the front wall of said truck body; a pair of second wall members rigidly connected along said outer sides of said floor structure and having substantially the same longitudinal extent as said floor structure, said second wall members being joined to said front wall adjacent said outer sides of said floor structure to define the maximum width of said load-carrying body adjacent said forward edge, said second members further being transversely tapered so as to gradiently converge with respect to each other toward said rear edge of said floor structure to thereby define the minimum width of said body adjacent said rear edge, where said second wall members define transversely tapering side walls for said truck body; a tailgate member secured to said floor structure adjacent said rear edge and extending transversely between said side walls, said tailgate being longitudinally inclined with respect to said floor structure and joinable to said side walls so as to taper forwardly from said rear edge of said floor structure; and floor tapering means joined to said chassis and supporting said floor structure in a forwardly tapered position with said forward edge substantially below said rear edge, whereby said transversely tapering side walls and said forwardly tapering floor structure and tailgate member substantially increase the load-carrying capacity of the forward portion of said truck body with respect to the capacity of the rearward portion of said body and thereby distribute a substantial portion of the gross weight of a load in said body onto said front axle by shifting the center of gravity of said load forwardly of said rear truck axle.

2. A truck assembly in accordance with claim 1 wherein the rear portion of said truck body is hinged to said chassis to provide a dump-type truck body, and wherein hoisting means are connected between said chassis and said truck body to selectively raise and lower said body with respect to said chassis.

3. A truck assembly in accordance with claim 1 wherein said floor tapering means comprises a wedge-shaped underframe structure rigidly secured to said chassis and engageable with the underside of said floor structure to position the forward edge of said floor structure substantially below the rear edge thereof.

4. A truck assembly in accordance with claim 1 wherein said truck body floor structure comprises a substantially flat floor bed member having its underside rigidly supported by a plurality of transverse cross-beams and a pair of spaced longitudinal beams, and wherein said rearward portion of said chassis includes a pair of longitudinal chassis members spaced substantially the same distance apart as said longitudinal beams of said floor structure so that said beams of said floor structure are supported directly above said longitudinal chassis members.

5. A truck assembly in accordance with claim 4 wherein said floor tapering means comprises a wedge-shaped member positioned above each of said chassis members and wherein said wedge-shaped members define forwardly inclined surfaces engageable with said longitudinal beams of said floor structure to support said floor structure in said forwardly tapered position.

6. A dump-type truck for hauling a load of material comprising, in combination: an elongate truck chassis including a pair of spaced longitudinal chassis members on its rearward portion and having longitudinally spaced front and rear axles for receiving ground-engaging wheels; a tapered underframe structure positioned above said rearward portion of said chassis comprising a pair of rigid wedge-shaped members secured to said longitudinal chassis members and defining forwardly tapered support surfaces; a load-carrying truck body positioned above said longitudinal chassis members and pivotally joined to said truck chassis; hoist means for selectively pivoting said body between a raised dumping position and a lowered load-hauling position; said body including a reinforced floor structure having longitudinal outer side edges and further having forward and back transverse edges positioned forwardly and rearwardly respectively of said rear axle; a pair of longitudinal support beams rigidly secured to the underside of said floor structure and transversely spaced so as to be engageable with said forwardly tapered support surfaces of said underframe structure with said body in said lowered load-hauling position so that said underframe structure thereby supports said floor structure in a forwardly tapered position; a first wall member rigidly secured to said floor structure adjacent said forward edge and extending transversely across said floor structure defining the front wall of said truck body; a pair of second wall members rigidly connected along said outer sides of said floor structure and having substantially the same longitudinal extent as said floor structure, said second wall members being joined to said front wall adjacent said outer sides of said floor structure to define the maximum width of said load-carrying body adjacent said front edge, said second members further being transversely tapered so as to gradiently converge with respect to each other toward said rear edge of said floor structure to thereby define the minimum width of said body adjacent said rear edge; said second wall members including top edges positioned in substantially the same plane so as to provide said body with a maximum depth adjacent said front edge and a minimum depth adjacent said rear edge, whereby said second wall members define spaced side walls for said truck body; a tailgate member secured to said floor structure adjacent said rear edge and joined transversely between said side walls, said tailgate extending upwardly to said top edges of said side walls and being longitudinally inclined with respect to said floor structure so as to taper forwardly from said rear edge of said floor structure, whereby said transversely tapering side walls and said forwardly tapering floor structure and tailgate member substantially increase the load-carrying capacity of the forward portion of said truck body with respect to the capacity of the rearward portion of said body and thereby distribute a substantial portion of the gross weight of a load in said body onto said front axle by shifting the center of gravity of said load forwardly of said rear truck axle.

References Cited
UNITED STATES PATENTS

| | | | |
|---|---|---|---|
| 1,627,336 | 5/1927 | Nelson. | |
| 1,989,129 | 1/1935 | Atwell | 296—28 |
| 2,658,795 | 11/1953 | Nicholson | 298—17 |
| 2,692,796 | 10/1954 | Rittenhouse | 298—17 |
| 2,721,097 | 10/1955 | Rittenhouse. | |
| 2,872,240 | 2/1959 | Bennett | 296—28 |
| 2,880,977 | 4/1959 | Maxon | 298—7 |
| 3,336,080 | 8/1967 | Heck et al. | 298—17 |

BENJAMIN HERSH, *Primary Examiner.*

L. D. MORRIS, *Assistant Examiner.*